United States Patent
Homma

(10) Patent No.: US 12,280,804 B2
(45) Date of Patent: Apr. 22, 2025

(54) DRIVING TAKEOVER CONTROL APPARATUS IMPLEMENTED BASED ON MEASURED DRIVER ALERTNESS LEVEL

(71) Applicant: SUBARU CORPORATION, Tokyo (JP)

(72) Inventor: Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 15 days.

(21) Appl. No.: 17/385,675

(22) Filed: Jul. 26, 2021

(65) Prior Publication Data

US 2022/0032959 A1 Feb. 3, 2022

(30) Foreign Application Priority Data

Jul. 30, 2020 (JP) ................................. 2020-129719

(51) Int. Cl.
*B60W 40/08* (2012.01)
*B60W 10/20* (2006.01)
(Continued)

(52) U.S. Cl.
CPC ........ *B60W 60/0018* (2020.02); *B60W 10/20* (2013.01); *B60W 40/08* (2013.01);
(Continued)

(58) Field of Classification Search
CPC ......... B60W 60/0018; B60W 60/0059; B60W 60/0053; B60W 2540/229; B60W 10/20;
(Continued)

(56) References Cited

U.S. PATENT DOCUMENTS

2017/0212525 A1* 7/2017 Wang ..................... B60W 50/10
2018/0081359 A1* 3/2018 Otaki .................... G05D 1/0061
(Continued)

FOREIGN PATENT DOCUMENTS

GB 2574877 A * 6/2018 .......... B60W 30/182
JP H03-96439 A 4/1991
(Continued)

OTHER PUBLICATIONS

Notice of Reasons for Refusal received in corresponding Japanese Patent Application No. 2020-129719, dated Mar. 5, 2024.
(Continued)

*Primary Examiner* — Jess Whittington
*Assistant Examiner* — Rami Nabih Bedewi
(74) *Attorney, Agent, or Firm* — Rimon P.C.

(57) ABSTRACT

A driving takeover control apparatus is equipped in a vehicle capable of travelling by automated driving and controls a driving takeover operation at a transition from high automated driving to low automated driving. The apparatus includes a driver operation device, a vehicle driving device, an alertness detecting device, a computation control device, and an output limiting device. A driver operates the driver operation device to steer the vehicle and adjust a vehicle speed. The vehicle driving device steers the vehicle and adjusts the vehicle speed based on an operation amount given to the driver operation device. The alertness detecting device is detects an alertness level of the driver at the transition. The computation control device drives the output limiting device to perform an output limitation operation if the alertness level is a certain level or lower. The output limiting device limits an output of the vehicle driving device.

18 Claims, 3 Drawing Sheets

(51) Int. Cl.
  *B60W 50/08*  (2020.01)
  *B60W 50/12*  (2012.01)
  *B60W 60/00*  (2020.01)

(52) U.S. Cl.
  CPC .......... *B60W 50/082* (2013.01); *B60W 50/12* (2013.01); *B60W 60/0053* (2020.02); *B60W 60/0059* (2020.02); *B60W 2540/229* (2020.02); *B60W 2710/20* (2013.01); *B60W 2720/106* (2013.01)

(58) Field of Classification Search
  CPC .... B60W 40/08; B60W 50/082; B60W 50/12; B60W 2710/20; B60W 2720/106
  See application file for complete search history.

(56) References Cited

U.S. PATENT DOCUMENTS

| | | | |
|---|---|---|---|
| 2019/0276047 A1* | 9/2019 | Suzuki | G08B 3/10 |
| 2019/0278264 A1 | 9/2019 | Oyama et al. | |
| 2019/0366844 A1* | 12/2019 | Yoon | A61B 5/18 |
| 2019/0382009 A1* | 12/2019 | Iwasa | G08G 1/0969 |
| 2019/0382016 A1* | 12/2019 | Chow | B60W 30/18009 |
| 2020/0019163 A1* | 1/2020 | Horii | G08G 1/16 |
| 2020/0086886 A1 | 3/2020 | Kaneko et al. | |
| 2020/0139992 A1 | 5/2020 | Oba | |
| 2022/0126878 A1* | 4/2022 | Moustafa | G06T 1/0007 |

FOREIGN PATENT DOCUMENTS

| | | |
|---|---|---|
| JP | H07-40757 A | 2/1995 |
| JP | 2006-205794 A | 8/2006 |
| JP | 2008-170404 A | 7/2008 |
| JP | 2018-045450 A | 3/2018 |
| JP | 2019-156058 A | 9/2019 |
| WO | 2018-056104 A1 | 3/2018 |
| WO | 2018-134994 A1 | 7/2018 |
| WO | 2019-017216 A1 | 1/2019 |

OTHER PUBLICATIONS

Notice of Reasons for Refusal received in corresponding Japanese Patent Application No. 2020-129719, dated Jun. 11, 2024.

* cited by examiner

DRIVING TAKEOVER CONTROL APPARATUS IMPLEMENTED BASED ON MEASURED DRIVER ALERTNESS LEVEL

CROSS-REFERENCE TO RELATED APPLICATIONS

The present application claims priority from Japanese Patent Application No. 2020-129719 filed on Jul. 30, 2020, the entire contents of which are hereby incorporated by reference.

BACKGROUND

The disclosure relates to a driving takeover control apparatus and particularly relates to a driving takeover control apparatus that improves safety in takeover of driving at a transition from high automated driving to low automated driving.

Japanese Unexamined Patent Application Publication (JP-A) No. 2008-170404 discloses an automated driving support apparatus capable of performing automated driving which does not depend on an operation performed by a driver and in which a vehicle-control electronic control unit (ECU) controls all of an accelerator operation, a brake operation, and a steering wheel operation, which are operations related to vehicle behaviors. The automated driving support apparatus disclosed in JP-A No. 2008-170404 drives and controls an engine device, a brake device, an electric power steering device, and so forth, thereby performing automated driving until a stop timing on a guiding route.

JP-A No. 2019-156058 describes a travel control system that generates, at a transition from automated driving to manual driving, an alarm indicating the transition to a driver. Accordingly, at a transition from an automated driving mode, the type of alarm can be changed in accordance with the posture of the driver so that the driver can immediately become aware of the end of a driving support mode.

SUMMARY

An aspect of the disclosure provides a driving takeover control apparatus that is to be equipped in a vehicle capable of travelling by automated driving having a level and configured to control a driving takeover operation at a transition from high automated driving that is high in the level to low automated driving that is low in the level. The driving takeover control apparatus includes a driver operation device, a vehicle driving device, an alertness detecting device, a computation control device, and an output limiting device. The driver operation device is configured to be operated, by a driver who drives the vehicle, to steer the vehicle and adjust a vehicle speed. The vehicle driving device is configured to steer the vehicle and adjust the vehicle speed in accordance with an amount of operation given to the driver operation device by the driver. The alertness detecting device is configured to detect an alertness level of the driver at the transition from the high automated driving to the low automated driving. The computation control device is configured to drive the output limiting device to perform an output limitation operation in a case where the alertness level of the driver detected by the alertness detecting device is lower than or equal to a certain level at the transition from the high automated driving to the low automated driving. The output limiting device is configured to, in response to an instruction from the computation control device in the output limitation operation, limit an output of the vehicle driving device with respect to the amount of operation given to the driver operation device by the driver.

An aspect of the disclosure provides a driving takeover control apparatus that is to be equipped in a vehicle capable of travelling by automated driving having a level and configured to control a driving takeover operation at a transition from high automated driving that is high in the level to low automated driving that is low in the level. The driving takeover control apparatus includes a driver operation device, an actuator, and circuitry. The driver operation device is configured to be operated, by a driver who drives the vehicle, to steer the vehicle and adjust a vehicle speed of the vehicle. The driver operation device includes one or more of a steering wheel of the vehicle, an accelerator pedal of the vehicle, and a brake pedal of the vehicle. The actuator is configured to steer the vehicle and adjust the vehicle speed in accordance with an amount of operation given to the driver operation device by the driver. The circuitry is configured to detect an alertness level of the driver at the transition from the high automated driving to the low automated driving. The circuitry is configured to perform an output limitation operation in a case where the alertness level of the driver is lower than or equal to a certain level at the transition from the high automated driving to the low automated driving. The circuitry is configured to, in response to an instruction in the output limitation operation, limit an output of the actuator with respect to the amount of operation given to the driver operation device by the driver.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
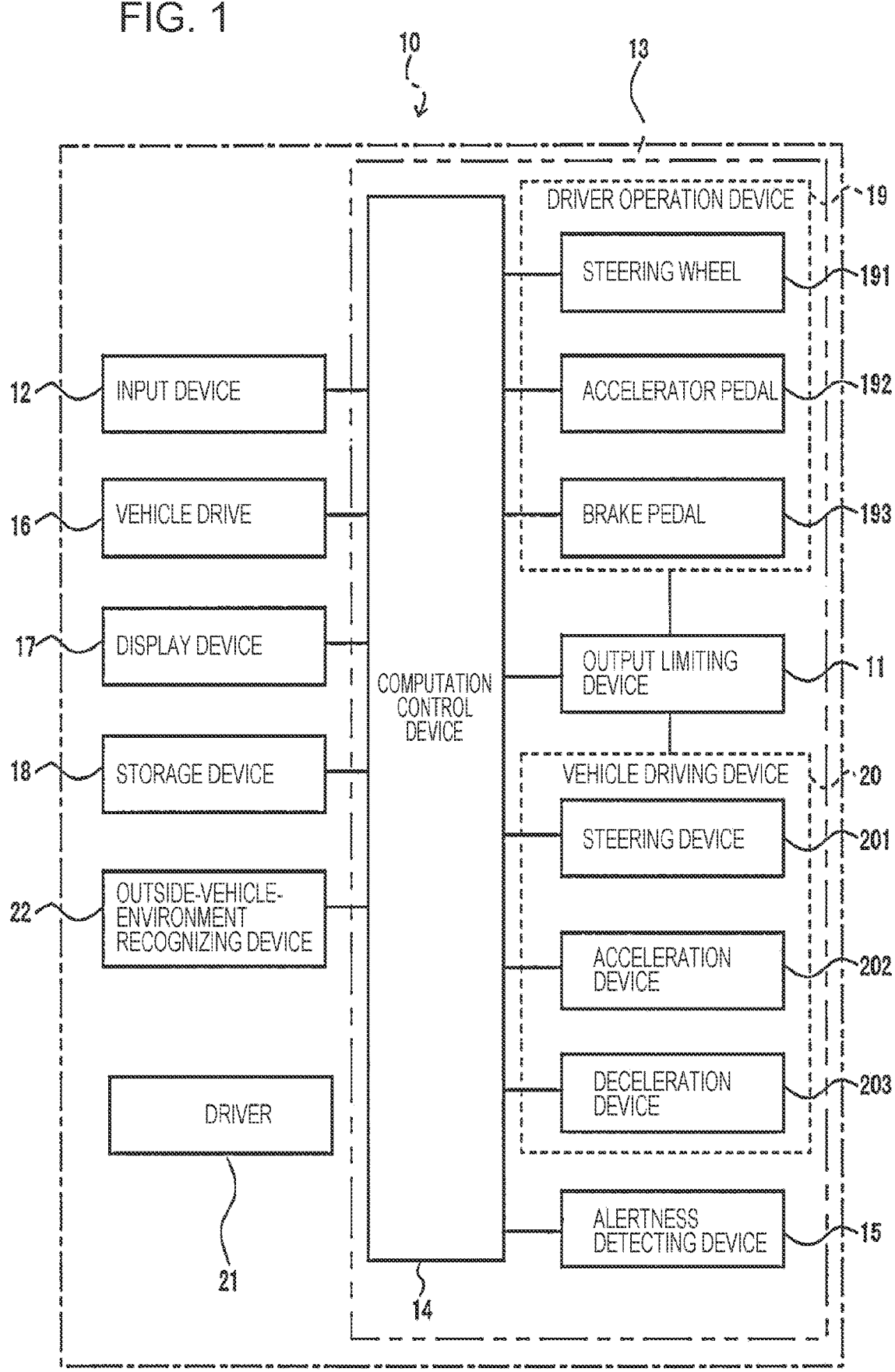
FIG. 1 is a block diagram illustrating a coupling configuration of a vehicle equipped with a driving takeover control apparatus according to an embodiment of the disclosure.

The technique described in JP-A No. 2019-156058 is susceptible to improvement from the viewpoint of safety at a transition of driving.

In one example, if the alertness level of a driver is low at a transition of a vehicle driving mode from automated driving to manual driving, the driver may rush to operate a steering wheel or an accelerator pedal, causing an issue of vehicle behavior stability in the manual driving immediately after the transition.

It is desirable to provide a driving takeover control apparatus capable of securing vehicle behavior stability at a transition from high automated driving to low automated driving.

Hereinafter, a driving takeover control apparatus according to an embodiment of the disclosure will be described in detail with reference to the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the following description, a forward direction, a backward direction, an upward direction, a downward direction, a right direction, and a left direction will be used as appropriate.

In the present embodiment, a vehicle 10 is capable of travelling at various levels of driving automation.

The levels of driving automation are defined by SAE International J3016, and JASO TP 18004 which is a reference translation into Japanese. According to the definition, the levels of driving automation include Level 0 to Level 5 as described below.

Level 0 is referred to as "no driving automation" in which, for example, the driver performs all dynamic driving tasks. Level 1 is referred to as "driver assistance" in which, for example, the system performs a sub-task of vehicle movement control in either of a forward-backward direction and a right-left direction in a limited region. Level 2 is referred to as "partial driving automation" in which, for example, the system performs a sub-task of vehicle movement control in both of a forward-backward direction and a right-left direction in a limited region. Level 3 is referred to as "conditional driving automation" in which, for example, the system performs all dynamic driving tasks in a limited region and the driver is expected to appropriately respond to an intervention request or the like from the system when the operation is difficult to be continued. Level 4 is referred to as "high driving automation" in which, for example, the system performs, in a limited region, all dynamic driving tasks and responding to a situation in which the operation is difficult to be continued. Level 5 is referred to as "full driving automation" in which, for example, the system performs all dynamic driving tasks and responding to a situation in which the operation is difficult to be continued.

High automated driving and low automated driving according to the present embodiment have relative levels of driving automation. In other words, the high automated driving is higher in the level of automated driving than the low automated driving. When the high automated driving corresponds to Level 5, the low automated driving corresponds to any one of Level 4 to Level 0. For example, driving at Level 5 is referred to as full-automated driving, whereas driving at Level 4 to Level 1 is referred to as semi-automated driving.

The present embodiment improves safety at a transition of the level of driving automation. The transition of the level of driving automation includes a transition from full-automated driving to semi-automated driving, a transition from full-automated driving to manual driving, a transition from high-level semi-automated driving to low-level semi-automated driving, and a transition from semi-automated driving to manual driving. In the present embodiment, a transition from full-automated driving to manual driving will be described as an example.

FIG. 1 is a block diagram illustrating an overview of the vehicle 10 including a driving takeover control apparatus 13 according to an embodiment of the disclosure.

The driving takeover control apparatus 13 is equipped in the vehicle 10 capable of travelling by automated driving having a level, and controls a driving takeover operation at a transition from high automated driving that is high in the level to low automated driving that is low in the level. As will be described below, in a case where the alertness level of a driver 21 is low at takeover of driving, the driving takeover control apparatus 13 limits an output of a vehicle driving device 20 with respect to the amount of operation given to a driver operation device 19 by the driver 21.

The devices equipped in the vehicle 10 for implementing automated driving will be described. In one example, the vehicle 10 includes a computation control device 14, an input device 12, an alertness detecting device 15, a vehicle drive 16, a display device 17, a storage device 18, an outside-vehicle-environment recognizing device 22, the driver operation device 19, an output limiting device 11, and the vehicle driving device 20.

Among these devices included in the vehicle 10, the driver operation device 19, the vehicle driving device 20, the alertness detecting device 15, the computation control device 14, and the output limiting device 11 constitute the driving takeover control apparatus 13. The driving takeover control apparatus 13 is a part of a control mechanism that controls the vehicle 10.

The computation control device 14 is a controller of the vehicle 10 and is, for example, an electronic control unit (ECU) or the like including a computation device or the like that performs various computation operations and the like. The computation control device 14 controls the vehicle driving device 20 on the basis of input information or the like received from the input device 12 and the outside-vehicle-environment recognizing device 22, thereby performing automated driving of the vehicle 10. Furthermore, in a case where the alertness level of the driver 21 detected by the alertness detecting device 15 at a transition from the high automated driving to the low automated driving is lower than or equal to a certain level, the computation control device 14 drives the output limiting device 11 to perform an output limitation operation of the vehicle driving device 20.

The input device 12 includes a switch, such as a press button, and a touch screen or the like that can be operated by a passenger who is the driver 21. The driver 21 operates the input device 12, thereby being capable of setting the high automated driving or providing an instruction to start or end the high automated driving.

The alertness detecting device 15 detects the alertness level of the driver 21 at a transition from the high automated driving to the low automated driving. In one example, the alertness detecting device 15 detects the alertness level of the driver 21 on the basis of the eye-opening ratio, the state of looking aside, and the posture of the driver 21, driving duration, the frequency at which an in-vehicle display is operated, the type of content displayed, upper-body behaviors, and so forth. The alertness detecting device 15 may detect the alertness level of the driver 21 based on one or more of images of the driver 21 captured by a camera and a detection information with a sensor. For example, when the eye-opening ratio is small, when the degree of looking aside is high, when the posture is close to a reclining position, when the driving duration is long, when the frequency at which the in-vehicle display is operated is low, when the displayed content is content attracting attention, such as video, or when the number of upper-body behaviors is small, the alertness detecting device 15 detects that the alertness level of the driver 21 is low. Here, the alertness detecting device 15 may detect the alertness level of the driver 21 at takeover of driving when the level of driving automation changes, or continuously while the vehicle 10 is travelling.

The vehicle drive 16 includes an engine, a motor, and the like serving as a power source for causing the vehicle 10 to travel.

The display device 17 is a display including a liquid crystal panel or the like disposed in, for example, a dashboard inside the vehicle 10 or the vicinity thereof. The display device 17 displays information related to travelling of the vehicle 10 to report the information to the driver 21.

The storage device 18 includes a random access memory (RAM) and a read-only memory (ROM) and stores information to be used for travelling of the vehicle 10. The storage device 18 also stores a program to be used for executing operations of the driving takeover control apparatus 13.

The outside-vehicle-environment recognizing device 22 is a device for recognizing an environment outside the vehicle 10 and includes, for example, a stereo camera, a radar device, a Global Positioning System (GPS) receiver, an Intelligent Transport System (ITS) terminal, and the like.

The driver operation device 19 receives operations performed, by the driver 21 who drives the vehicle 10, to steer the vehicle 10 and adjust a vehicle speed. In one example, the driver operation device 19 includes a steering wheel 191, an accelerator pedal 192, and a brake pedal 193.

The output limiting device 11 limits an output of the vehicle driving device 20 with respect to the amount of operation given to the driver operation device 19 by the driver 21, in response to an instruction from the computation control device 14 in the output limitation operation. The output limiting device 11 controls an output of the vehicle driving device 20 in response to an input from the driver operation device 19 and may be implemented as a part of the function of the computation control device 14.

The vehicle driving device 20 is an actuator or the like that steers the vehicle 10 and adjusts a vehicle speed in accordance with the amount of operation given to the driver operation device 19 by the driver 21. In one example, the vehicle driving device 20 includes a steering device 201, an acceleration device 202, and a deceleration device 203. The steering device 201 steers the vehicle 10 in accordance with a rotation angle at which the driver 21 rotates the steering wheel 191. The acceleration device 202 accelerates the vehicle in accordance with the amount by which the driver 21 depresses the accelerator pedal 192. The deceleration device 203 decelerates the vehicle 10 in accordance with the amount by which the driver 21 depresses the brake pedal 193.

The computation control device 14 of the vehicle 10 performs the high automated driving and the low automated driving in the following manner, for example.

In the high automated driving (for example, full-automated driving), the computation control device 14 performs various computation operations on the basis of information received from the outside-vehicle-environment recognizing device 22 and so forth, and constantly monitors a current travelling state, an outside environment, and so forth. The computation control device 14 controls the vehicle drive 16, the vehicle driving device 20, and so forth, and performs appropriate automated driving in accordance with a current situation. In this way, the computation control device 14 has an automated driving function and is capable of automatically performing driving operations of the vehicle 10.

The computation control device 14 changes the driving of the vehicle 10 from the high automated driving to the low automated driving (for example, manual driving) on the basis of input information received from the input device 12 or the outside-vehicle-environment recognizing device 22. At this time, as will be described below, the alertness detecting device 15 detects the alertness level of the driver 21. If the detected alertness level is not sufficient, the output limiting device 11 limits an output from the driver operation device 19 to the vehicle driving device 20 in response to an instruction from the computation control device 14.

Figure 2:
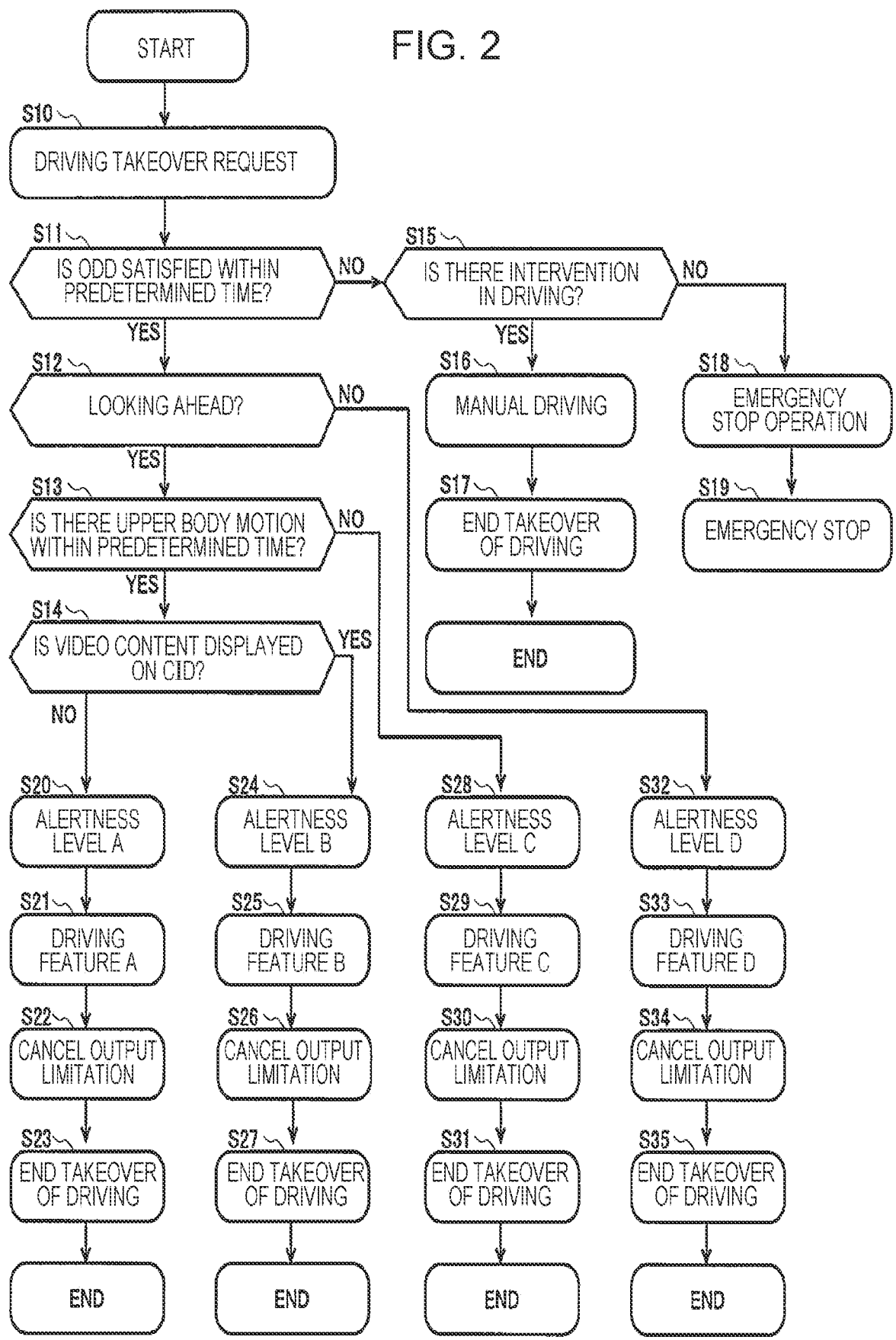
FIG. 2 is a flowchart illustrating an operation of the driving takeover control apparatus according to the embodiment of the disclosure.
Figure 3:
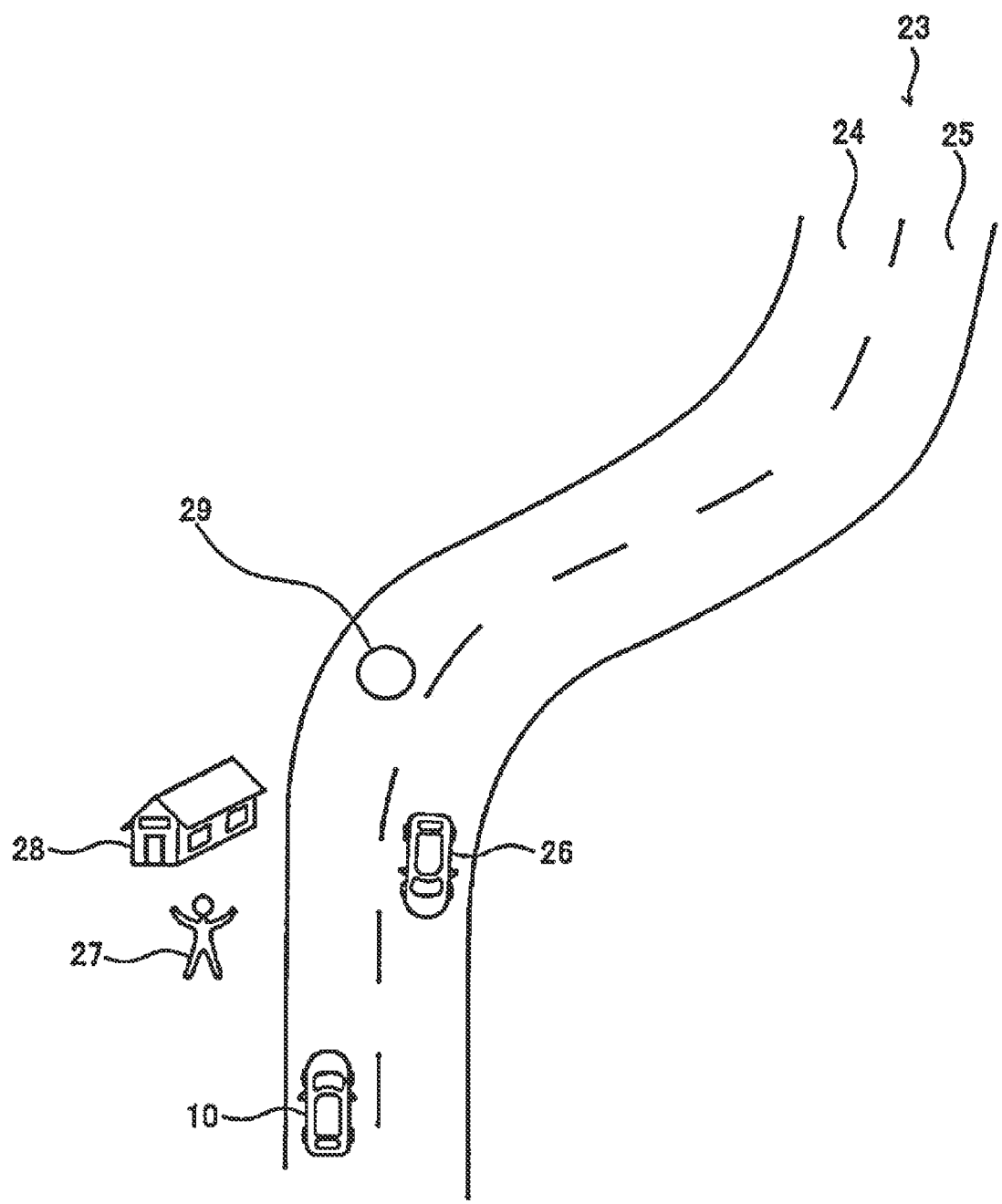
FIG. 3 is a conceptual diagram illustrating an application example of the driving takeover control apparatus according to the embodiment of the disclosure.

With reference to FIG. 2 and FIG. 3, a description will be given of the operation performed by the driving takeover control apparatus 13 at a transition from the high automated driving to the low automated driving of the vehicle 10. FIG. 2 is a flowchart illustrating the operation of the driving takeover control apparatus 13. FIG. 3 is a conceptual diagram illustrating an application example of the driving takeover control apparatus 13.

Referring to FIG. 2, in step S10, the computation control device 14 makes a driving takeover request on the basis of outside-vehicle-environment information or the like received from the outside-vehicle-environment recognizing device 22. The timing at which the driving takeover request is made includes a planned timing and an unplanned timing. The planned timing is, for example, the timing at which the outside-vehicle-environment recognizing device 22 recognizes that the vehicle 10 has reached a branch point or a merging point of an expressway. On the other hand, the unplanned timing is, for example, the timing at which the outside-vehicle-environment recognizing device 22 recognizes an obstacle, such as a load fallen from a truck or the like.

In step S11, the computation control device 14 determines whether an operational design domain (ODD) is satisfied within a predetermined time. In one example, the computation control device 14 determines whether a road condition, a geographical condition, an environmental condition, and so forth as the ODD are suitable for automated driving.

If the determination in step S11 is YES, that is, if the ODD is satisfied within the predetermined time, the computation control device 14 determines that there is time to spare, and proceeds to step S12, where the computation control device 14 performs manual driving with an output limitation in accordance with the alertness level of the driver 21.

If the determination in step S11 is NO, that is, if the ODD is not satisfied within the predetermined time, the computation control device 14 determines that there is no time to spare, and proceeds to step S15.

In steps S12 to S14, the computation control device 14 determines the alertness level of the driver 21 and limits an output from the driver operation device 19 to the vehicle driving device 20 in accordance with the alertness level. In the present embodiment, the alertness level of the driver 21 is classified into any one of alertness level A to alertness level D in descending order of alertness. That is, alertness level A is the highest in alertness and alertness level D is the lowest in alertness. In the present embodiment, the degree of output limitation is varied in the following manner in accordance with the alertness level of the driver 21.

In step S12, the computation control device 14 determines whether the driver 21 is looking ahead, that is, looking where the vehicle 10 is travelling, on the bass of an image or the like of the driver 21 captured by the alertness detecting device 15.

If the determination in step S12 is YES, that is, if the driver 21 is looking ahead, the driver 21 is not looking aside and the alertness level of the driver 21 is not very low, and thus the computation control device 14 proceeds to step S13.

If the determination in step S12 is NO, that is, if the driver 21 is not looking ahead, the driver 21 is looking aside and the alertness level of the driver 21 is estimated to be very low close to a sleeping state, and thus the computation control device 14 proceeds to step S32.

In step S13, the computation control device 14 determines whether there is an upper body motion of the driver 21 within a predetermined time, on the bass of an image or the like of the driver 21 captured by the alertness detecting device 15.

If the determination in step S13 is YES, that is, if there is an upper body motion of the driver 21 within the predetermined time, the driver 21 moves his/her body, and thus a determination is made that the alertness level of the driver 21 is kept at a certain level. Thus, the computation control device 14 proceeds to step S14.

If the determination in step S13 is NO, that is, if there is no upper body motion of the driver 21 within the predetermined time, the body motion of the driver 21 is stopped and the alertness level of the driver 21 is estimated to be low. Thus, the computation control device 14 proceeds to step S28.

In step S14, the computation control device 14 determines whether video content is displayed on a center information display (CID).

If the determination in step S14 is NO, that is, if video content is not displayed on the CID, attention of the driver 21 is not paid to video content, and thus a determination is made that the alertness level of the driver 21 is kept at a certain level. Thus, the computation control device 14 proceeds to step S20.

If the determination in step S14 is YES, that is, if video content is displayed on the CID, there is a possibility that attention of the driver 21 is paid to the video content, and the alertness level of the driver 21 is not estimated to be high. Thus, the computation control device 14 proceeds to step S24.

In step S15, the computation control device 14 determines whether there is intervention of the driver 21 in driving. That is, the computation control device 14 determines whether the driver 21 has operated the steering wheel 191, the accelerator pedal 192, or the brake pedal 193 within a certain time.

If the determination in step S15 is YES, that is, if the driver 21 has operated the steering wheel 191, the accelerator pedal 192, or the brake pedal 193 within the certain time, the computation control device 14 proceeds to step S16.

If the determination in step S15 is NO, that is, if the driver 21 has not operated the steering wheel 191, the accelerator pedal 192, or the brake pedal 193 within the certain time, the computation control device 14 proceeds to step S18.

In step S16, manual driving is performed. That is, the driver 21 operates the steering wheel 191, the accelerator pedal 192, and the brake pedal 193 to cause the steering device 201, the acceleration device 202, and the deceleration device 203 to operate, thereby manually driving the vehicle 10. At this time, an output limitation is not necessarily imposed by the output limiting device 11.

In step S17, the takeover from full-automated driving to manual driving ends. Thereafter, the driver 21 operates the driver operation device 19 to manually drive the vehicle 10.

In step S18, because there is no driving intervention of the driver 21, the computation control device 14 determines that the ODD is not satisfied due to an emergency situation or the like, and operates the vehicle driving device 20 to perform an emergency stop operation.

In step S19, the computation control device 14 operates the vehicle driving device 20 and urgently causes the vehicle 10 to stop at a road shoulder. In this way, the occurrence of a collision accident or the like of the vehicle 10 can be prevented.

In steps S20 to S23, the computation control device 14 limits an output of the amount of driving of the vehicle driving device 20 in the following manner in accordance with the alertness level of the driver 21.

In step S20, the computation control device 14 determines that the alertness level of the driver 21 is alertness level A. Alertness level A is relatively high although the degree of alertness is not sufficient.

In step S21, the computation control device 14 executes driving feature A. That is, the computation control device 14 causes the output limiting device 11 to limit, at a degree set in advance as driving feature A, the amount of output of the vehicle driving device 20 in accordance with the amount of operation given to the driver operation device 19. In driving feature A, the degree of output limitation is the lowest in the present embodiment, and the amount of driving of the vehicle driving device 20 is slightly limited with respect to the amount of operation given to the driver operation device 19 by the driver 21. In this way, a transition to manual driving at a low level of driving automation can be smoothly performed.

In one example, in step S21, when the driver 21 rotates the steering wheel 191, the output limiting device 11 reduces the steering angle of the steering device 201 compared to that in a normal manual driving state. Furthermore, in step S21, for example, when the driver 21 depresses the accelerator pedal 192, the output limiting device 11 reduces the degree at which the acceleration device 202 accelerates the vehicle 10 compared to that in the normal manual driving state.

In step S21, the output of the amount of driving of the vehicle driving device 20 with respect to the amount of operation of the driver operation device 19 is limited. However, no limitation may be imposed on the brake pedal 193 and the deceleration device 203. That is, in step S21, when the driver 21 depresses the brake pedal 193 to decelerate or stop the vehicle 10, the computation control device 14 makes the degree of decelerating the vehicle 10 by the deceleration device 203 equivalent to or higher than that in the normal manual driving state. In this way, the vehicle 10 can be effectively decelerated or stopped by using a reactive operation of the driver 21 at the takeover of driving. The same applies to step S25, step S29, and step S33, which will be described below.

Furthermore, in step S21, whether an operation performed by the driver 21 is a sudden operation may be determined, and the above-described output limitation may be imposed when the operation is a sudden operation. In one example, the computation control device 14 calculates an operation amount per unit time of the operation given to the driver operation device 19 by the driver 21. For example, the computation control device 14 calculates a rotation angle per unit time of the steering wheel 191, a depression amount per unit time of the accelerator pedal 192, and so forth. If the operation amount per unit time is larger than or equal to a certain value, the computation control device 14 determines that the operation given to the driver operation device 19 by the driver 21 is a sudden operation, and the output limiting device 11 limits the output of the amount of driving of the vehicle driving device 20. On the other hand, if the operation amount per unit time is smaller than the certain value, the computation control device 14 determines that the operation given to the driver operation device 19 by the driver 21 is not a sudden operation, and the output limiting device 11 does not limit the output of the amount of driving of the vehicle driving device 20. The same applies to step S25, step S29, and step S33, which will be described below.

For example, with reference to FIG. 3, the output limitation operation in step S21 will be described in more detail. FIG. 3 is a schematic diagram illustrating an example of a situation in which the above-described output limitation is imposed.

Here, the vehicle 10 is travelling along a lane 24 of a road 23 by full-automated driving, and another vehicle 26 is driving along an opposite lane 25. In addition, a person 27 and a building 28 are present by the road 23. An obstacle 29 is present in front of the vehicle 10 that is travelling by full-automated driving. In response to detection of the obstacle 29 by the outside-vehicle-environment recognizing device 22, the driving of the vehicle 10 changes from full-automated driving to manual driving.

In this case, if the transition from full-automated driving to manual driving occurs without any measures when the alertness level of the driver 21 is insufficient, the driver 21 may be surprised by the transition and may wrongly operate the steering wheel 191 and the accelerator pedal 192, and the vehicle 10 may significantly deviate from the lane 24. Furthermore, the vehicle 10 traveling along the lane 24 may wrongly travel toward the opposite lane 25.

Accordingly, in the present embodiment, an output limitation is imposed in such a situation. In one example, an output limitation is imposed on the amount of driving of the steering device 201 and the acceleration device 202 with respect to the amount of operation given to the steering wheel 191 and the accelerator pedal 192 by the driver 21 in accordance with the alertness level of the driver 21. Imposing an output limitation herein means reducing the amount of driving of the steering device 201 and the acceleration device 202 with respect to the amount of operation given to the steering wheel 191 and the accelerator pedal 192 compared to that in normal manual driving in which no output limitation is imposed. Thus, even if the driver 21 depresses the accelerator pedal 192 by mistake, the output limiting device 11 imposes an output limitation on the acceleration device 202, and accordingly the occurrence of a collision accident or the like of the vehicle 10 can be prevented. Furthermore, even if the driver 21 rotates the steering wheel 191 beyond necessity by mistake, the output limiting device 11 imposes an output limitation on the steering device 201, and accordingly the occurrence of a collision accident or the like of the vehicle 10 can be prevented.

Furthermore, in step S21, the output limiting device 11 is capable of imposing an output limitation to avoid an accident on the basis of information received from the outside-vehicle-environment recognizing device 22. For example, if the driver 21 wrongly operates the steering wheel 191 or the accelerator pedal 192 and thus the vehicle 10 is going to travel toward the person 27, the obstacle 29, the building 28, or the opposite lane 25, the output limiting device 11 limits the output of the steering device 201 and the acceleration device 202 for the person 27 or the like in response to an instruction from the computation control device 14, and accordingly collision of the vehicle 10 with the person 27 or the like can be prevented.

Furthermore, in step S21 and the like, the degree of output limitation may vary between the devices constituting the vehicle driving device 20. For example, when the vehicle 10 is travelling in a downtown area at night, the output limiting device 11 imposes an output limitation to make the output of the steering device 201 zero and relatively loosens the output limitation on the acceleration device 202 so that the vehicle 10 does not collide with a pedestrian or the like. Accordingly, when the alertness level of the driver 21 is insufficient, the traveling direction of the vehicle 10 can be fixed, and safety in takeover of driving under a specific condition can be improved.

In step S22, the output limitation is cancelled. That is, the output limiting device 11 does not operate. When the driver 21 operates the driver operation device 19, the vehicle driving device 20 drives the vehicle 10 as in normal manual driving.

In one example, at the time when the driver 21 operates the driver operation device 19, that is, the steering wheel 191, the accelerator pedal 192, or the brake pedal 193 in step S21, it can be estimated that the driver 21 has become alert. As a result of not imposing an output limitation in step S22 and thereafter, the driver 21 is capable of accurately drive the vehicle 10 in an avoidance operation. For example, referring to FIG. 3, as a result of not imposing an output limitation on the avoidance operation, a collision of the vehicle 10 with the person 27 or the building 28 can be prevented by manual driving by the driver 21, and also deviation of the vehicle 10 toward the opposite lane 25 can be prevented.

In step S23, the takeover from full-automated driving to manual driving ends. Thereafter, the driver 21 operates the driver operation device 19 to manually drive the vehicle 10.

The operations in steps S24 to S27 are substantially the same as the above-described operations in steps S20 to S23, but the degree of output limitation based on the alertness level of the driver 21 is different.

In step S24, the computation control device 14 determines that the alertness level of the driver 21 is alertness level B. Alertness level B is estimated to be lower than the above-described alertness level A because video content is displayed inside the vehicle 10.

In step S25, the computation control device 14 executes driving feature B. That is, the computation control device 14 causes the output limiting device 11 to limit, at a degree set in advance as driving feature B, the amount of output of the vehicle driving device 20 in accordance with the amount of operation given to the driver operation device 19. In driving feature B, the degree of output limitation is higher than in the above-described driving feature A, and the amount of driving of the vehicle driving device 20 is further limited with respect to the amount of operation given to the driver operation device 19 by the driver 21.

In one example, in step S25, when the driver 21 rotates the steering wheel 191, the output limiting device 11 reduces the steering angle of the steering device 201 compared to that in the above-described driving feature A in response to an instruction from the computation control device 14. Furthermore, in step S25, for example, when the driver 21 depresses the accelerator pedal 192, the output limiting device reduces the degree at which the acceleration device 202 accelerates the vehicle 10 compared to that in the above-described driving feature A.

In step S26, the output limitation is cancelled. As a result of not imposing an output limitation in step S26 and thereafter, the driver 21 is capable of accurately driving the vehicle 10 in an avoidance operation after he/she has become alert.

In step S27, the takeover from full-automated driving to manual driving ends. Thereafter, the driver 21 operates the driver operation device 19 to manually drive the vehicle 10.

The operations in steps S28 to S31 are substantially the same as the above-described operations in steps S24 to S27, but the degree of output limitation based on the alertness level of the driver 21 is different.

In step S28, the computation control device 14 determines that the alertness level of the driver 21 is alertness level C. Alertness level C is estimated to be lower than the above-described alertness level B because it is determined in step S13 that there is no upper body motion within the predetermined time.

In step S29, the computation control device 14 executes driving feature C. That is, the computation control device 14 causes the output limiting device 11 to limit, at a degree set in advance as driving feature C, the amount of output of the vehicle driving device 20 in accordance with the amount of operation given to the driver operation device 19. In driving feature C, the degree of output limitation is higher than in the above-described driving feature B, and the amount of driving of the vehicle driving device 20 is greatly limited with respect to the amount of operation given to the driver operation device 19 by the driver 21.

In one example, in step S29, when the driver 21 rotates the steering wheel 191, the output limiting device 11 reduces the steering angle of the steering device 201 compared to that in the above-described driving feature B. Furthermore, in step S29, for example, when the driver 21 depresses the accelerator pedal 192, the output limiting device 11 reduces the degree at which the acceleration device 202 accelerates the vehicle 10 compared to that in the above-described driving feature B.

In step S30, the output limitation is cancelled. That is, as a result of the driver operation device 19, that is, the steering wheel 191, the accelerator pedal 192, or the brake pedal 193 being operated by the driver 21 in step S29, it can be estimated that the driver 21 has become alert. As a result of not imposing an output limitation in step S30 and thereafter, the driver 21 is capable of accurately driving the vehicle 10 in an avoidance operation after he/she has become alert.

In step S31, the takeover from full-automated driving to manual driving ends. Thereafter, the driver 21 operates the driver operation device 19 to manually drive the vehicle 10.

The operations in steps S32 to S35 are substantially the same as the above-described operations in steps S28 to S31, but the degree of output limitation based on the alertness level of the driver 21 is different.

In step S32, the computation control device 14 determines that the alertness level of the driver 21 is alertness level D. Alertness level D is estimated to be lower than the above-described alertness level C because it is determined in step S12 that the driver 21 is not looking ahead.

In step S33, the computation control device 14 executes driving feature D. That is, the computation control device 14 causes the output limiting device 11 to limit, at a degree set in advance as driving feature D, the amount of output of the vehicle driving device 20 in accordance with the amount of operation given to the driver operation device 19. In driving feature D, the degree of output limitation is higher than in the above-described driving feature C, and the amount of driving of the vehicle driving device 20 is more greatly limited with respect to the amount of operation given to the driver operation device 19 by the driver 21.

In one example, in step S33, when the driver 21 rotates the steering wheel 191, the output limiting device 11 reduces the steering angle of the steering device 201 compared to that in the above-described driving feature C. Furthermore, in step S33, for example, when the driver 21 depresses the accelerator pedal 192, the output limiting device 11 reduces the degree at which the acceleration device 202 accelerates the vehicle 10 compared to that in the above-described driving feature C.

In step S34, the output limitation is cancelled. As a result of not imposing an output limitation in step S34 and thereafter, the driver 21 is capable of accurately driving the vehicle 10 in an avoidance operation after he/she has become alert.

In step S35, the takeover from full-automated driving to manual driving ends. Thereafter, the driver 21 operates the driver operation device 19 to manually drive the vehicle 10.

The functions of the driving takeover control apparatus 13 have been described above.

The following main effects can be obtained from the above-described embodiment.

According to the embodiment of the disclosure, if the alertness level of the driver 21 is insufficient at a transition from the high automated driving to the low automated driving, a sudden behavior change of the vehicle 10 at the takeover of driving can be suppressed by limiting the output of the vehicle driving device 20, for example, the output of the acceleration device 202 or the steering device 201. In other words, at the takeover of driving to the low automated driving, a wrong operation of the vehicle driving device 20 resulting from haste of the driver 21 can be reduced.

According to the embodiment of the disclosure, as a result of limiting the output of the vehicle driving device 20 in accordance with an environment outside the vehicle 10, travelling of the vehicle 10 toward the obstacle 29 can be limited if the obstacle 29 is present in front of the vehicle 10.

According to the embodiment of the disclosure, as a result of limiting the output to the steering device 201 or the acceleration device 202, sudden steering and acceleration of the vehicle 10 can be limited at takeover of driving.

According to the embodiment of the disclosure, if the output of the vehicle driving device 20 is temporarily limited, it is estimated that the driver 21 who has performed the limited operation becomes alert. Thus, as a result of not imposing an output limitation thereafter, safety driving of the vehicle 10 can be secured in manual driving by the driver 21.

According to the embodiment of the disclosure, as a result of changing the output limitation of the vehicle driving device 20 in accordance with the alertness level of the driver 21, a sudden behavior change of the vehicle 10 at the takeover of driving can be suppressed more effectively.

While the embodiment of the disclosure has been described above, the disclosure is not limited to the embodiment, and modifications will be apparent without departing from the gist of the disclosure. In addition, the above-described features can be combined in any manner.

For example, in step S22 and the like, the degree of cancellation of the output limitation may vary between the devices constituting the vehicle driving device 20. For example, in step S22, the output limiting device 11 may cancel or loosen the output limitation on the steering device 201 and may continue the output limitation on the acceleration device 202. Accordingly, acceleration of the vehicle 10 based on a wrong operation by the driver 21 can be suppressed, and an operation of the steering wheel 191 by the driver 21 makes it possible to perform a danger avoidance operation of the vehicle 10.

The technical spirit that can be grasped from the above-described embodiment will be described below together with the effects thereof.

In the driving takeover control apparatus, the output limiting device causes the degree of output limitation to vary between the steering device, the acceleration device, and the deceleration device constituting the vehicle driving device. Accordingly, it is possible to improve the safety and steering stability at takeover of driving under a specific condition.

In the driving takeover control apparatus, the output limiting device causes the degree of cancellation of output limitation to vary between the steering device, the acceleration device, and the deceleration device constituting the vehicle driving device. Accordingly, it is possible to improve the safety and steering stability in an avoidance operation of the vehicle at takeover of driving.

The computation control device 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the computation control device 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving takeover control apparatus to be equipped in a vehicle configured to travel by automated driving having levels, the driving takeover control apparatus being configured to control a driving takeover operation during a transition from high automated driving that is high in the levels to low automated driving that is low in the levels, the driving takeover control apparatus comprising:
 a driver operation device configured to be operated by a driver who drives the vehicle to steer the vehicle and adjust a vehicle speed of the vehicle;
 a vehicle driving device configured to steer the vehicle and adjust the vehicle speed in accordance with an amount of operation given to the driver operation device by the driver;
 an alertness detecting device configured to detect an alertness level of the driver during the transition from the automated driving to manual driving;
 a computation control device configured to:
  determine the amount of operation given to the driver operation device by the driver per unit time is greater than a reference value during the transition from the automated driving to manual driving; and
  in response to determining that the amount of operation given to the driver operation device is greater than the reference value, generate an instruction to perform an output limitation operation to limit an output of the vehicle driving device with respect to the amount of operation given to the driver operation device, wherein an extent to which the output of the vehicle driving device is limited is adjusted in accordance with the detected alertness level of the driver; and
 an output limiting device configured to, in response to the instruction from the computation control device, perform the output limitation operation to limit the output of the vehicle driving device,
 wherein the vehicle driving device comprises a steering device, an acceleration device, and a deceleration device,
 wherein the computation control device is further configured to, in response to recognizing that the vehicle is traveling in a predetermined area at predetermined time of day, generate the instruction to perform the output limitation operation to limit an output of the steering device more than outputs of the acceleration device and the deceleration device, and
 wherein the output limiting device is configured to, in response to the instruction from the computation control device, perform the output limitation operation to limit the output of the vehicle driving device.

2. The driving takeover control apparatus according to claim 1, further comprising
 an outside-vehicle-environment recognizing device configured to recognize an environment outside the vehicle in a direction in which the vehicle travels, wherein
 the output limiting device is configured to limit the output of the vehicle driving device in accordance with the environment recognized by the outside-vehicle-environment recognizing device.

3. The driving takeover control apparatus according to claim 1, wherein
 the vehicle driving device comprises a steering device, an acceleration device, and a deceleration device, and
 the output limiting device is configured to limit an output of the steering device and an output of the acceleration device, and not to limit an output of the deceleration device.

4. The driving takeover control apparatus according to claim 2, wherein
 the vehicle driving device comprises a steering device, an acceleration device, and a deceleration device, and
 the output limiting device is configured to limit an output of the steering device and an output of the acceleration device, and not to limit an output of the deceleration device.

5. The driving takeover control apparatus according to claim 1, wherein the output limiting device is configured to, at the transition from the automated driving to the manual driving, temporarily perform the output limitation operation in response to the instruction from the computation control device and then cancel the output limitation operation.

6. The driving takeover control apparatus according to claim 2, wherein the output limiting device is configured to, at the transition from the automated driving to the manual driving, temporarily perform the output limitation operation in response to the instruction from the computation control device and then cancel the output limitation operation.

7. The driving takeover control apparatus according to claim 3, wherein the output limiting device is configured to, at the transition from the automated driving to the manual driving, temporarily perform the output limitation operation in response to the instruction from the computation control device and then cancel the output limitation operation.

8. The driving takeover control apparatus according to claim 4, wherein the output limiting device is configured to, at the transition from the automated driving to the manual driving, temporarily perform the output limitation operation in response to the instruction from the computation control device and then cancel the output limitation operation.

9. The driving takeover control apparatus according to claim 1,
wherein the computation control device is further configured to:
select one of at least three characteristics based on the detected alertness level of the driver; and
generate, based on the selected one of the at least three characteristics, the instruction to perform the output limitation operation, in response to determining that the operation amount is greater than the reference value, and
wherein the output limiting device is configured to, in response to the instruction from the computation control device, perform the output limitation operation to limit the output of the vehicle driving device.

10. The driving takeover control apparatus according to claim 1, wherein the computation control device is configured to generate the instruction so that the extent becomes greater as the detected alertness level of the driver is lower.

11. The driving takeover control apparatus according to claim 10, wherein the vehicle driving device comprises a steering device, an acceleration device, and a deceleration device, and
the output limiting device is configured to limit an output of the steering device and an output of the acceleration device, and not to limit an output of the deceleration device.

12. A driving takeover control apparatus that is to be equipped in a vehicle configured to travel by automated driving having levels, the driving takeover control apparatus being configured to control a driving takeover operation during a transition from high automated driving that is high in the levels to low automated driving that is low in the levels, the driving takeover control apparatus comprising:
a driver operation device configured to be operated by a driver who drives the vehicle to steer the vehicle and adjust a vehicle speed of the vehicle, the driver operation device including one or more of a steering wheel of the vehicle, an accelerator pedal of the vehicle, and a brake pedal of the vehicle;
an actuator configured to steer the vehicle and adjust the vehicle speed in accordance with an amount of operation given to the driver operation device by the driver; and
circuitry configured to:
detect an alertness level of the driver during the transition from the automated driving to manual driving;
determine the amount of operation given to the driver operation device by the driver per unit time is greater than a reference value during the transition from the automated driving to manual driving;
in response to determining that the amount of operation given to the driver operation device is greater than the reference value, generate an instruction to perform an output limitation operation to limit an output of the actuator with respect to the amount of operation given to the driver operation device, wherein an extent to which the output of the vehicle driving device is limited is adjusted in accordance with the detected alertness level of the driver; and
in response to the instruction, perform the output limitation operation to limit the output of the actuator,
wherein the actuator comprises a steering device, an acceleration device, and a deceleration device, and
wherein the circuitry is further configured to:
in response to recognizing that the vehicle is traveling in a predetermined area at predetermined time of day, generate the instruction to perform the output limitation operation to limit an output of the steering device more than outputs of the acceleration device and the deceleration device; and
in response to the instruction, perform the output limitation operation to limit the output of the actuator.

13. The driving takeover control apparatus according to claim 12, wherein the circuitry is further configured to:
select one of at least three characteristics based on the detected alertness level of the driver;
generate, based on the selected one of the at least three characteristics, the instruction to perform the output limitation operation, in response to determining that the operation amount is greater than the reference value; and
in response to the instruction, perform the output limitation operation to limit the output of the actuator.

14. The driving takeover control apparatus according to claim 12, wherein the circuitry is configured to generate the instruction so that the extent becomes greater as the detected alertness level of the driver is lower.

15. The driving takeover control apparatus according to claim 14, wherein
the actuator comprises a steering device, an acceleration device, and a deceleration device, and
the circuitry is configured to limit an output of the steering device and an output of the acceleration device, and not to limit an output of the deceleration device.

16. A driving takeover control apparatus that is to be equipped in a vehicle configured to travel by automated driving having levels, the driving takeover control apparatus being configured to control a driving takeover operation during a transition from high automated driving that is high in the levels to low automated driving that is low in the levels, the driving takeover control apparatus comprising:
a driver operation device configured to be operated by a driver who drives the vehicle to steer the vehicle and adjust a vehicle speed of the vehicle, the driver operation device including one or more of a steering wheel of the vehicle, an accelerator pedal of the vehicle, and a brake pedal of the vehicle;
an actuator configured to steer the vehicle and adjust the vehicle speed in accordance with an amount of operation given to the driver operation device by the driver; and
circuitry configured to:
determine whether an alertness level of the driver during the transition from the automated driving to manual driving is a first level or a second level, the second level is associated with a lower alertness level than the first level;
determine whether the amount of operation given to the driver operation device by the driver per unit time is greater than a reference value during the transition from the automated driving to manual driving;
in response to determining (1) that the alertness level of the driver is the first level and (2) that the amount of operation given to the driver operation device is greater than the reference value, generate a first instruction to perform a first output limitation operation to reduce an output of the actuator with respect to the amount of operation given to the driver operation device by a first degree;

in response to determining (1) that the alertness level of the driver is the second level and (2) that the amount of operation given to the driver operation device is greater than the reference value, generate a second instruction to perform a second output limitation operation to reduce the output of the actuator with respect to the amount of operation given to the driver operation device by a second degree, the second degree being greater than the first degree;

in response to the first instruction, perform the first output limitation operation to limit the output of the actuator; and in response to the second instruction, perform the second output limitation operation to limit the output of the actuator.

17. The driving takeover control apparatus according to claim 16, wherein the actuator comprises a steering device, an acceleration device, and a deceleration device, and the circuitry is configured to, when performing the first or second output limitation operation, (i) reduce (1) an output of the steering device with respect to the amount of operation given to the driver operation device and (2) an output of the acceleration device, and (ii) not to reduce an output of the deceleration device with respect to the amount of operation given to the driver operation device.

18. The driving takeover control apparatus according to claim 16, wherein the circuitry is configured to:

determine whether video content is displayed on a display of the vehicle;

in response to determining that the video content is not displayed, determine the alertness level of the driver is the first level; and in response to determining that the video content is displayed, determine the alertness level of the driver is the second level.

* * * * *